United States Patent [19]

Senator et al.

[11] Patent Number: 5,802,364

[45] Date of Patent: Sep. 1, 1998

[54] METADEVICE DRIVER RENAME/ EXCHANGE TECHNIQUE FOR A COMPUTER SYSTEM INCORPORATING A PLURALITY OF INDEPENDENT DEVICE DRIVERS

[75] Inventors: Steven T. Senator; Dale R. Passmore, both of Colorado Springs; Robert S. Gittins, Woodland Park, all of Colo.

[73] Assignee: Sun Microsystems, Inc., Palo Alto, Calif.

[21] Appl. No.: 632,006

[22] Filed: Apr. 15, 1996

[51] Int. Cl.$^6$ .................. G06F 15/163; G06F 9/00; G06F 9/46

[52] U.S. Cl. .......................... 395/681; 711/114

[58] Field of Search .................. 364/245.1, 245.4, 364/246.11; 395/726, 680, 681; 711/114

[56] References Cited

U.S. PATENT DOCUMENTS

| | | | |
|---|---|---|---|
| 5,129,088 | 7/1992 | Auslander et al. | 395/700 |
| 5,237,680 | 8/1993 | Adams et al. | 395/600 |
| 5,241,624 | 8/1993 | Torres | 395/129 |
| 5,321,826 | 6/1994 | Ushiro | 395/425 |
| 5,471,675 | 11/1995 | Zias . | |
| 5,479,653 | 12/1995 | Jones | 395/182.03 |
| 5,515,538 | 5/1996 | Kleiman | 395/733 |
| 5,530,960 | 6/1996 | Parks et al. | 395/825 |
| 5,546,558 | 8/1996 | Jacobson et al. | 395/441 |
| 5,630,076 | 5/1997 | Saulpaugh et al. | 395/284 |
| 5,655,126 | 8/1997 | Glenning | 395/750.06 |

FOREIGN PATENT DOCUMENTS 0 584 909 A 6/1993 European Pat. Off. .

OTHER PUBLICATIONS

Simpson, Dave; Gauging the ups and downs of hierarchical storage management; Digital News and Review, v11, n. 2, p. 37(4), Jan. 17, 1994.
Taber, David; MetaDisk Driver Technical Description; Sun-FLASH vol. 22; #9, Oct. 1990.
Patent Abstracts of Japan, vol. 12, No. 401 (P-776), 25 Oct. 1988 & JP 63 142451 A (Fujitsu Ltd.), 14 Jun. 1988.
Patent Abstracts of Japan, vol. 14, No. 508 (P-1128), 7 Nov. 1990 & JP 02 212910 A (NEC Corp), 24 Aug. 1990.
Computer Technology Review, vol. 12, No. 14, Nov. 1992, CA, pp. 18–19, D. Rathunde: "There is A Virtual Disk Type To Satisfy All Data Availability Needs".

Primary Examiner—Alvin E. Oberley
Assistant Examiner—Patricia Caldwell
Attorney, Agent, or Firm—William J. Kubida; Stuart T. Langley; Holland & Hart LLP

[57] ABSTRACT

A metadisk driver functionally intermediate a computer operating system and one or more metadrivers and underlying layered drivers provides a driver rename/exchange function which does not depend on any particular driver having knowledge of the private data structures of any of the other drivers. The rename/exchange technique implemented thereby may be conducted while the underlying devices are on-line and comprise atomic operations which are, therefore, recoverable inasmuch as the operation will have either been completed or will not be committed in the event of any interruption.

9 Claims, 5 Drawing Sheets

| | FORMER ROLE | | |
|---|---|---|---|
| | PARENT | SELF | CHILD |
| NEW ROLE PARENT | UPDATE CHILDREN (E) (R) | UPDATE SOURCE UP (E) | — |
| SELF | UPDATE DESTINATION DOWN (E) | UPDATE SELF (R) | UPDATE DESTINATION UP (E) |
| CHILD | — | UPDATE SOURCE DOWN (E) | UPDATE PARENTS (E) (R) |

Fig. 6

METADEVICE DRIVER RENAME/EXCHANGE TECHNIQUE FOR A COMPUTER SYSTEM INCORPORATING A PLURALITY OF INDEPENDENT DEVICE DRIVERS

CROSS REFERENCE TO RELATED APPLICATIONS

The present invention is related to the subject matter of U.S. patent application Ser. No. 08/632,217 for "Storage Manager Independent Configuration Interface Translator and Method" filed on even date herewith and assigned to Sun Microsystems, Inc., assignee of the present invention, the disclosure of which is hereby specifically incorporated herein by this reference.

BACKGROUND OF THE INVENTION

The present invention relates, in general, to the field of computers and computer operating systems for operatively controlling a plurality of device drivers coupled to a computer operating system through a metadevice, or metadisk, driver. More particularly, the present invention relates to a system, method and computer program product for renaming or exchanging identities of computer mass storage metadrivers and layered drivers which allows for the on-line distribution of changes to the driver hierarchy in a distributed, cooperative manner without the necessity of any particular driver having knowledge of the private data structures of others of the drivers.

Presently available computer mass storage subsystems for computer systems are generally limited in their overall performance, capacity, ease of administration and availability of data storage. Moreover, they do not allow metadrivers or underlying layered drivers to be renamed or exchanged while the system is on-line to allow for dynamic reconfiguration of mass storage devices.

SUMMARY OF THE INVENTION

The present invention advantageously provides a metadisk driver, (or metastorage device with a disk-like interface), functionally intermediate a computer operating system and one or more metadrivers and underlying layered drivers which provides a driver rename/exchange function which does not depend on any particular driver having knowledge of the private data structures of any of the other drivers.

Information about the configuration and state of all metadevices is preserved in a replicated state database to ensure data integrity.

The rename/exchange technique implemented thereby may be carried out as a multi-stage transaction and is sufficiently general to be utilized for a family tree of drivers that is arbitrarily wide or deep. Importantly, the rename and exchange functions can be conducted while the underlying devices are on-line and comprise atomic operations which are, therefore, recoverable inasmuch as the operation will have either been completed or will not be committed in the event of any interruption.

The system and method provided herein allows for up to three-way mirroring of any file system, database or other user data, on-line concatenation of physical computer mass storage disk drives, on-line expansion of file systems, disk striping, hot spares, UNIX™ files system ("UFS") logging and redundant array of inexpensive disks ("RAID") support.

In a particular embodiment disclosed herein, a method is provided for altering driver hierarchy in a computer system including a plurality of drivers having individual and interrelational attributes with respect to others of the plurality of drivers. The method comprises the steps of instructing a particular one of the drivers to alter its individual attribute and locking service to that particular one of the drivers and its "relatives" (i.e. those drivers in a "parent" or "child" relationship thereto.) The method also comprises the steps of altering the individual attribute of that particular one of the drivers and the interrelational attributes of each of the relatives and then unlocking service to that particular one of the drivers and its relatives.

In a more specific embodiment disclosed herein, a method is provided for altering driver hierarchy in a computer system including a plurality of drivers having individual and interrelational attributes with respect to others of the plurality of drivers. The method comprises the steps of compiling a list of available services for at least a designated one of the plurality of drivers, determining the individual attribute of the designated driver and the interrelational attributes of any parent and child drivers. The method further comprises the steps of locking service for the designated driver and its parent and child drivers, swapping roles of the designated driver and its parent and child drivers and unlocking service for the designated driver and its parent and child drivers.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
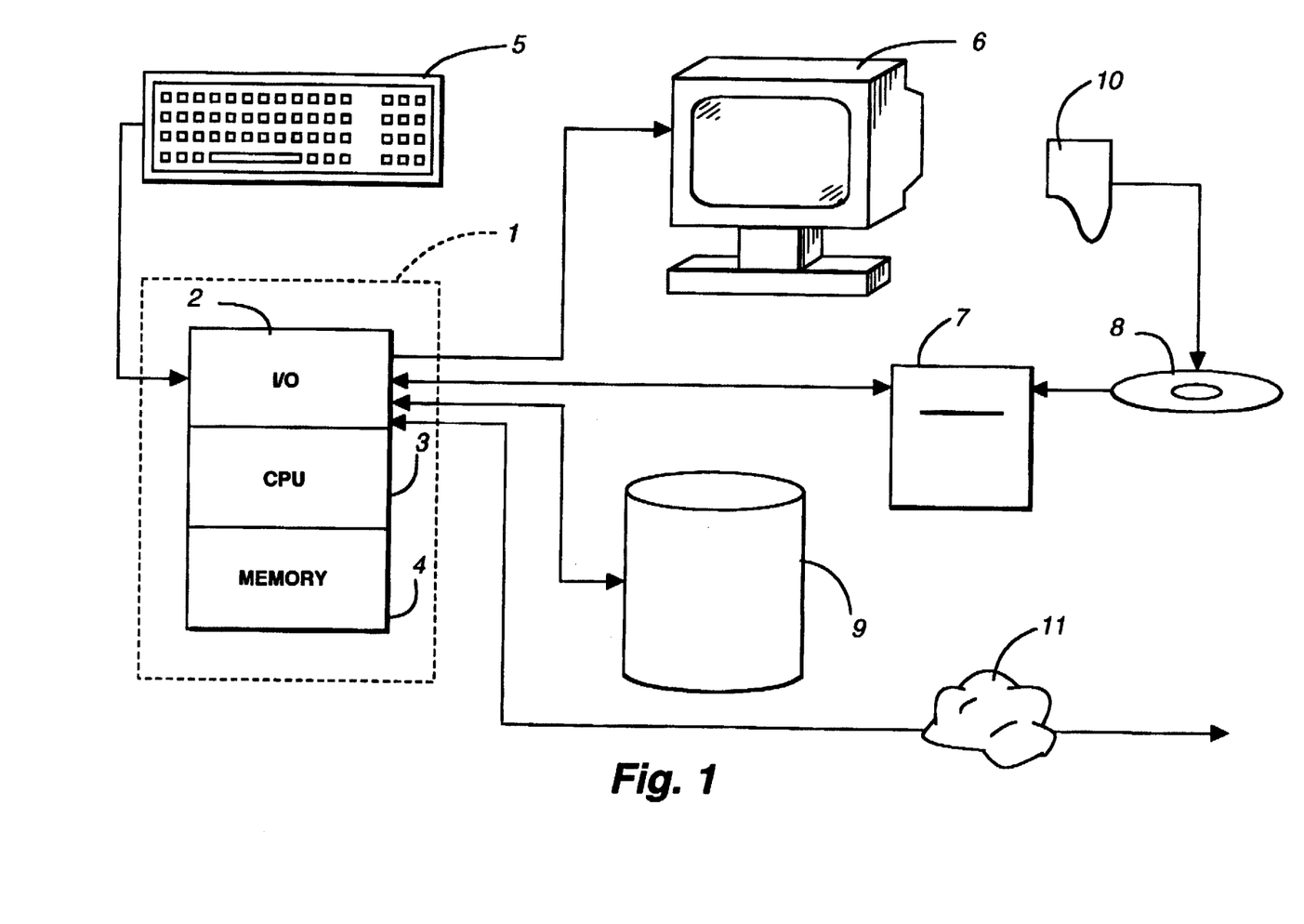
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 may be connected to a keyboard 5, a display unit 6, a disk storage unit 9, a CDROM drive or unit 7 or a computer network 11 such as a wide area network ("WAN"), local area network ("LAN") or other network connection such as the Internet. The CDROM unit 7 can read a CDROM or CDROM medium 8 which typically contains programs 10 and data. The computer program products containing mechanisms to effectuate the apparatus and methods of the present invention may reside in the memory section 4, or on a disk storage unit 9 or on the CDROM 8 or network 11 of such a system.

Figure 2:
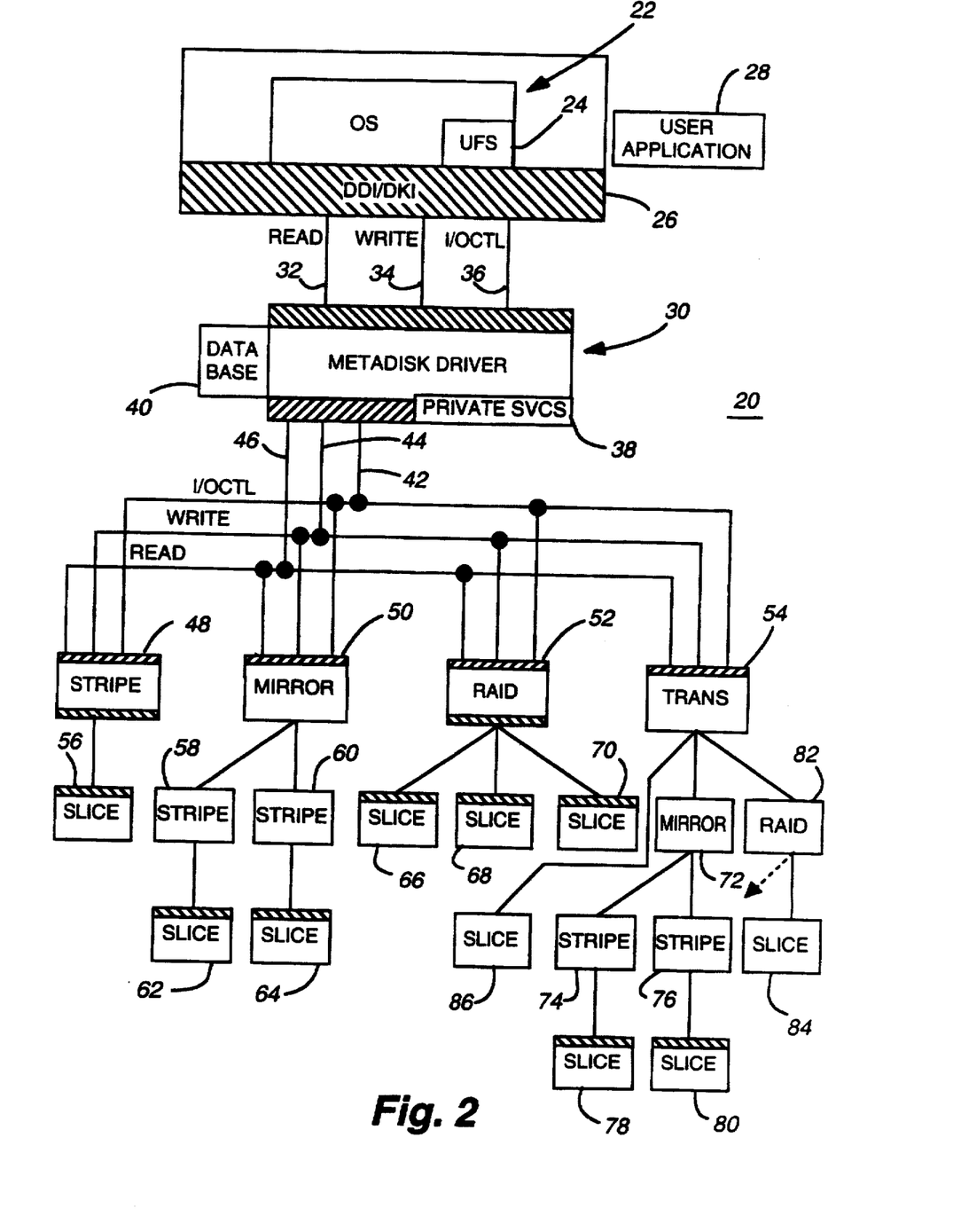
FIG. 2 a simplified conceptual representation of an exemplary computer program operating system incorporating a device driver interface for operative coupling to a plurality of metadrivers and underlying layered drivers through a metadisk driver for implementing the rename/exchange technique herein disclosed.

With reference now to FIG. 2, a representative computer system 20 is shown incorporating the rename/exchange technique of the present invention. The computer system 20 includes an operating system 22 which, in the context of a UNIX™ based system such as the Solaris™ operating system available from Sun Microsystems, Inc., assignee of the present invention, includes a UNIX™ file system ("UFS"). Such UNIX™ based operating systems also include a DDI/DKI interface 26 through which calls from the user application 28 may be made via operating system 22 calls and services.

A metadisk driver 30 is coupled to the operating system 22 through the DDI/DKI interface 26 through a corresponding DDI/DKI interface of the metadisk driver 30 itself. Representative calls that may be passed between the operating system 22 and the metadisk driver 30 include read 32, write 34 and input/output control ("IOCTL") 36. While not illustrated, other calls between the operating system 22 and the metadisk driver 30 are possible in accordance with conventional UNIX™ based operating systems.

As illustrated, the metadisk driver 30 may also include a portion dedicated to private services 38 as well as an associated database 40, as will be more fully described hereinafter. The metadisk driver 30 presents a metadisk driver interface to lower level metadrivers (or subdrivers) through, for example, calls such as IOCTL 42, write 44 and read 46. The corresponding metadrivers then also comprise a corresponding metadisk driver interface as shown.

The metadisk driver 30 is implemented as a set of loadable, pseudo device drivers and uses other physical device drivers to pass input/output ("I/O") requests to and from the underlying devices. The metadisk driver 30 resides between the file system interface and the device driver interface 26 and interprets information from both above and below. After passing through the metadisk driver 30, information is received in the expected form by both the file system and by the device drivers. The metadisk driver 30 is a loadable device driver and has all the same interfaces as any other device driver. The primary elements of the metadisk driver 30 include: metadevices, concatenation and striping, mirroring (including metamirrors and submirrors), UFS logging (not shown), hot spares (not shown), disksets and RAID devices.

Metadevices are the basic functional unit of the metadisk driver 30 and can be utilized like physical disk partitions or "slices". These logical devices can be made up of one or more component partitions which may be configured to use a single device, a concatenation of stripes or stripe of devices. Metadevices that comprise concatenations or stripes provide increased storage capacity while mirroring and UFS logging provide higher availability. Striping provides increased performance. In any event, metadevices are transparent to user application 28 software and to component controller hardware. They may be configured from IPI and SCSI devices on all SPARC™ systems and on SCSI and IDE devices on all x86 systems.

Each metadevice is either a concatenation or a stripe of component partitions. Concatenations and stripes work together to concatenate two or more slices together to create one larger slice. When partitions are concatenated, the addressing of the component blocks is done sequentially. Operating system 22 services, such as the file system, can use the entire concatenation.

The database 40 maintains state database replicas and provides the non-volatile storage necessary to keep track of configuration and status information for all metadrivers, metadevices, metamirrors, metatrans devices, hot spares and RAID devices. The replicas also keep track of error conditions that have occurred. After a metadevice is configured, it is necessary for the metadevice driver to remember its configuration and status information. The metadevice state database 40 is the metadevice driver's long term memory. The metadevice driver stores all the metadevice configuration information in the state database 40, including the configuration information about mirrors, submirrors, concatenations, stripes, metatrans devices and hot spares.

If the replicated metadevice state database 40 where to be lost, the metadevice driver would have no way of knowing any configuration information resulting in a loss of all data stored on metadevices. To protect against losing the metadevice state database 40 because of hardware failures, multiple replicas (or copies) or the state database 40 are maintained. These multiple replicas also protect the state database 40 against corruption that can result from a system "crash". Each replica of the state database 40 contains a checksum. When the state database 40 is updated, each replica is modified one at a time. If a crash occurs while the database 40 is being updated, only one of the replicas will be corrupted. When the system reboots, the metadevice driver uses the checksum embedded in the replicas to determine if a replica has been corrupted. Any corrupted replicas are then ignored.

If a disk that contains the metadevice state database 40 is turned off, the metadevices remain fully functional because the database is retrieved from one of the replicas still in operation. Changes made to the configuration following the reboot operation are stored only in the replicas that are in operation when the system comes back up. If the disk drive that was turned off is later turned back on, the data contained in the replica stored on that disk is ignored following a comparison with other replicas.

Exemplary of the metadevice drivers, or metadrivers, which may be utilized in conjunction with the metadisk driver 30 are a stripe metadriver 48, a mirror metadriver 50, a RAID metadriver 52 and a trans metadriver 54.

The stripe metadriver 48 presents a DDI/DKI interface to, for example, a slice (or partition) layered driver 56. On the other hand, the mirror metadriver 50 may be coupled to a pair of underlying stripe layered drivers 58, 60. The stripe layered drivers 58, 60 may be coupled to a respective slice layered driver 62, 64 through a DDI/DKI interface.

Striping is similar to concatenation with the exception that the addressing of the metadevice blocks is interlaced on the components rather than addressed sequentially. When stripes are defined, an interlace size may be specified which determines how much data is place on a component before moving to the next component of the stripe.

Because data is spread across a stripe, increased performance is realized due to the fact that reads and writes are spread across multiple disk arms. Moreover, concurrent I/O requests may use different disk arms as is the case with concatenation as well.

Mirroring is also supported on separate metadevices such as, for example mirror metadriver 50. This enables the system to tolerate single component failures with two-way mirroring and double failures with three-way mirroring. Mirroring may also be utilized for on-line backups of file systems.

Mirroring is set up by creation of a metamirror which is a special type of metadevice made up of one or more other metadevices. Each metadevice within a metamirror is called a submirror. Once a metamirror is defined, additional submirrors may be added without bringing down the system or disrupting reads and writes to existing metamirrors. When a submirror is attached, all the data from another submirror in the metamirror is automatically written to the newly attached submirror in a process called resynching. Once the resynching is complete, the new submirror is readable and writeable.

The RAID metadriver 52 presents a DDI/DKI interface for coupling to a number of underlying slice layered drivers 66, 68, 70. Although illustrated as comprising in this representative example only three slice layered drivers 66, 68 and 70, any number of such layered drivers may be included, depending on the RAID set and RAID level desired.

RAID devices may comprise three or more physical partitions, or "slices", such as slices 66–70 illustrated. Each partition is generally referred to as a column. The RAID metadriver 52 can be grown by concatenating additional partitions to the metadevice. RAID 5 utilizes multiple physical partitions to simulate a single large slice. A single sector on one or these physical slices may contain either a sector's worth of contiguous data or parity information relating to the data on the same sector of all other slices in the array. A RAID 5 configuration can recover from a single disk failure and is generally more cost effective that mirroring disks.

A trans metadriver 54 may be coupled to an underlying mirror layered driver 72 in turn having a pair of stripe layered drivers 74, 76 and respective slice layered drivers 78, 80. The trans metadriver 54 may also have an underlying RAID layered driver 82 as well as one or more underlying slice layered drivers 84. The trans metadriver 54 may also directly be coupled to an underlying slice layered driver 86, as shown.

Figure 3:
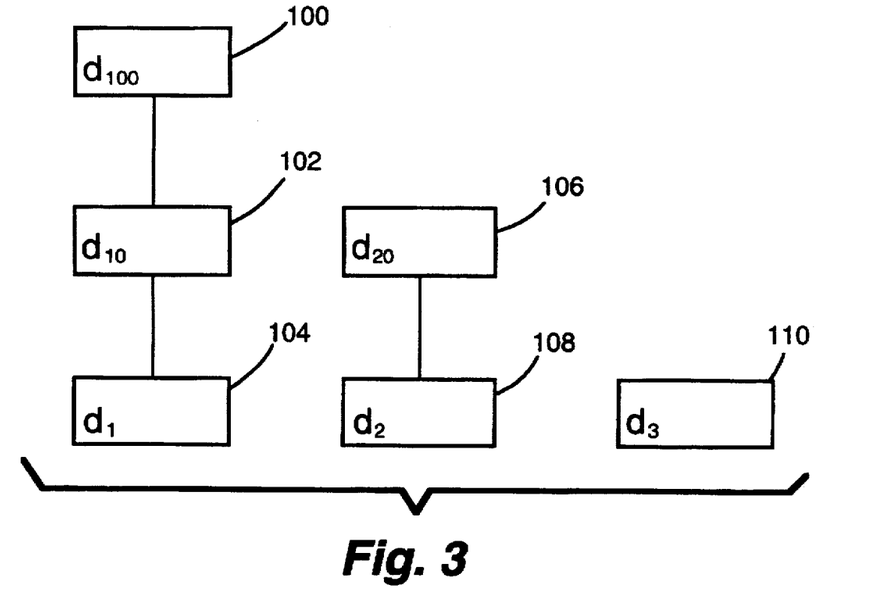
FIG. 3 is a simplified conceptual representation of a number of metadrivers and layered drivers as shown in FIG. 2 useful for illustrating the "self", "parent" and "child" relationships between drivers in subsequent rename and exchange operations resulting in changes to the driver hierarchy as shown in the succeeding figures.

With reference additionally now to FIG. 3, a simplified conceptual representation of a number of metadrivers and/or layered drivers as illustrated in the preceding figure is shown. The illustration of FIG. 3 is useful for illustrating the "self", "parent" and "child" relationship between drivers and subsequent rename and exchange operations which result in changes to the driver hierarchy as will be discussed more fully with respect to the succeeding figures. In this regard, a metadevice 100 may have a self designation of D100 while a child metadevice 102 of metadevice 100 may have a designation of D10. In turn, an additional child metadevice 104 of metadevice 102 may have a designation D1. Concurrently, metadevice 102 is the parent of metadevice 104 and metadevice 100 is the parent of metadevice 102.

In like manner, a relationship between other independent metadevices is shown wherein a metadevice 106 having a self designation of D20 is in a parental relationship to a metadevice 108 having a designation D2. Metadevice 108 is then the child of metadevice 106. A single independent metadevice 110 having a self designation of D3 is shown having neither parent nor child metadevices associated therewith.

Figure 4A:
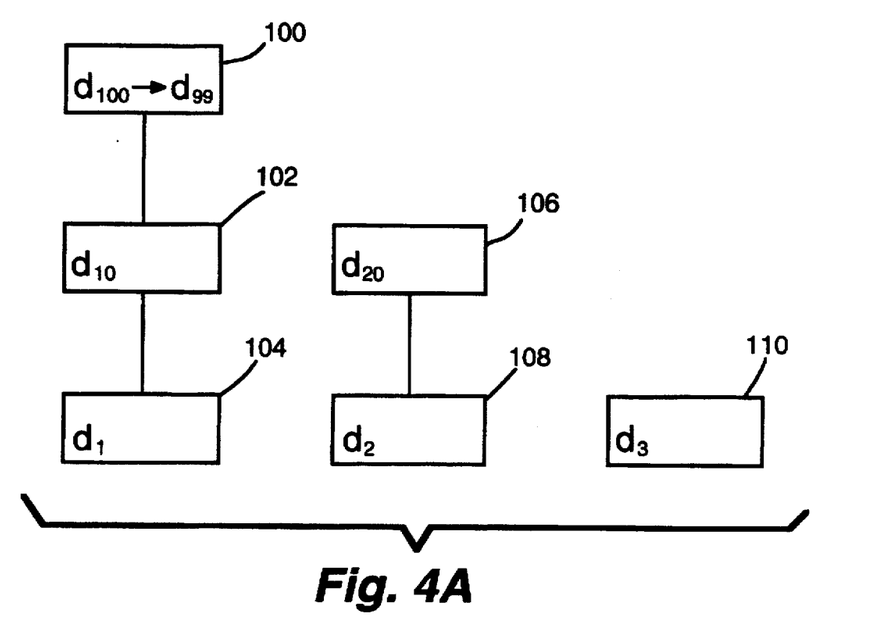
FIGS. 4A and 4B illustrate possible changes to the metadriver and layered driver hierarchy resulting from a rename of certain of the drivers wherein changes to "self" and "child" as well as "self", "parent" and "child" relationships occur respectively.

With reference additionally now to FIG. 4A, the simplified conceptual representation of metadevices and layered drivers shown in FIG. 3 is utilized in a rename operation wherein the self identification of metadevice 100 has been changed from D100 to D99. Utilizing the rename/exchange technique herein disclosed, metadevice 100 would then update its self designation to D99 and its child metadevice 102 (designated D10) would then update its parent to reflect the renaming of metadevice 100 to D99.

Figure 4B:
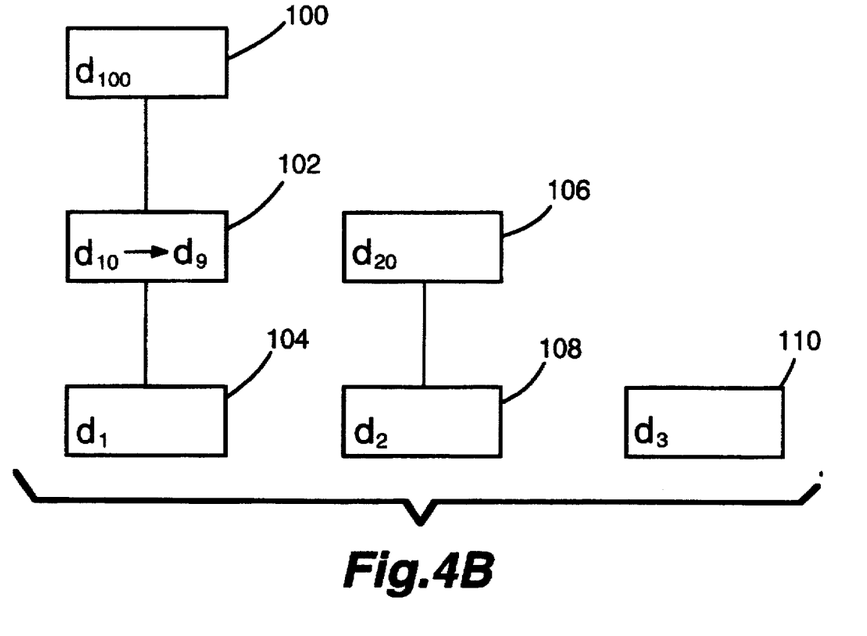

With reference additionally now to FIG. 4B, a further exemplary rename operation is shown based upon the initial configuration of the driver hierarchy as depicted in FIG. 3. In this representative example, metadevice 102 has been renamed from D10 to D9 requiring a self renaming to reflect the change in designation. In this example, however, metadevice 100 (designated D100) is in a parental relationship to metadevice 102 and it, therefore, will update its children to reflect the renaming of metadevice 102 to D9. Similarly, metadevice 104 is in a child relationship with respect to metadevice 102 and it will then update its parent designation to reflect the change of name in metadevice 102 to D9.

Figure 5A:
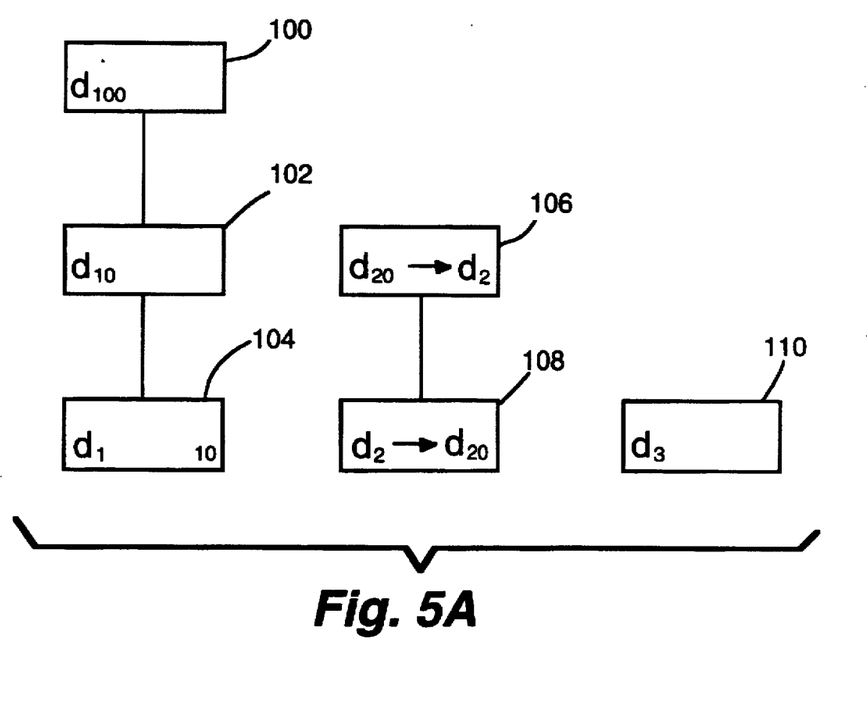
FIGS. 5A and 5B illustrate other possible changes to the metadriver and layered driver hierarchy resulting from an exchange of certain of the drivers as between two drivers, wherein the "self", "parent" and "child" relationship is altered, and as between two other drivers wherein the exchange involves a "parent" of other driver respectively.

With reference additionally now to FIG. 5A, a representative exchange operation in accordance with the present invention is shown wherein metadevices 106 (formerly D20) and metadevice 108 (formerly D2) of FIG. 3 have their self identifications exchanged such that metadevice 106 then becomes D2 (the parent) and metadevice 108 becomes D20 (the child). Stated another way, metadevice 106 (FIG. 3) updates its source down while metadevice 108 (FIG. 3) updates its destination up.

Figure 5B:
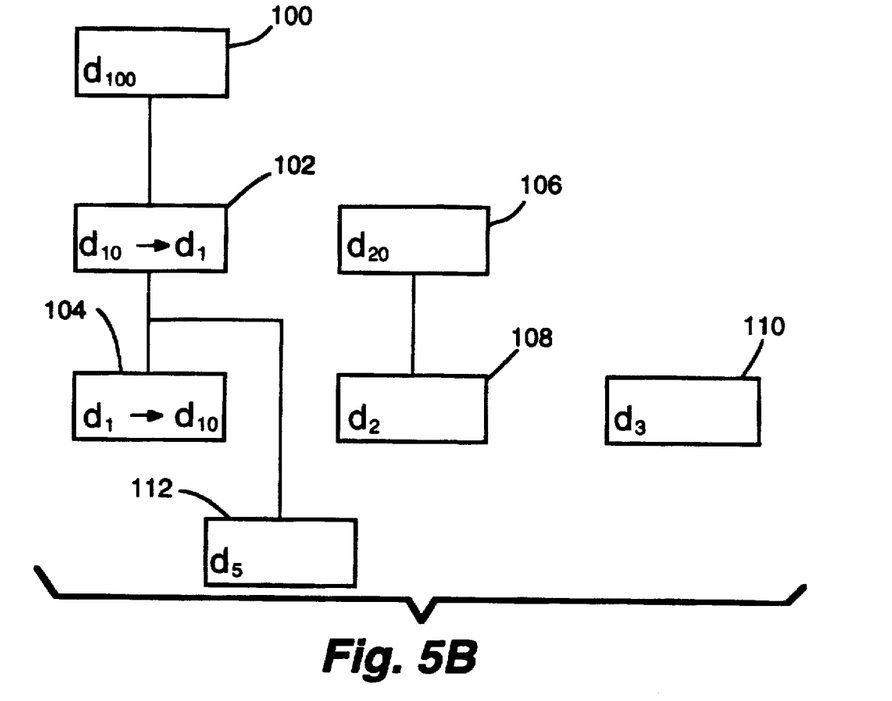

With reference additionally now to FIG. 5B, an alternative exemplary illustration of an exchange operation is shown wherein metadevices 102, 104 exchange their self identities such that metadevice 102 assumes the identity D1 and metadevice 104 assumes the prior identity of metadevice 102 of D10. In other words, metadevice 104 updates its destination up, while metadevice 102 updates its source down. In this illustration, metadevice 112 (D5) remains a child of metadevice 102 but its parent designation is now D1 instead of D10.

Figure 6:
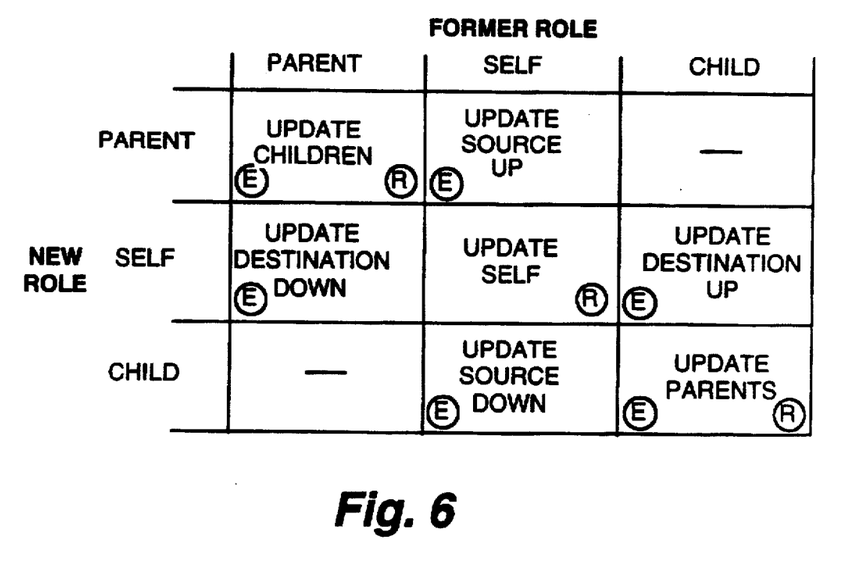
FIG. 6 is a tabular representation of the updates to metadriver and layered driver hierarchy implemented by the role swap services of the system and method of the present invention disclosed herein in both rename and exchange operations.

With reference additionally now to FIG. 6, the role swap services of the system and method of the present invention disclosed herein in both rename (designated by a circled "R") and exchange operations (designated by a circled "E") are illustrated as used to update the metadriver and/or layered driver hierarchy. The tabular representation of FIG. 6 forms the portion 6 of the process represented in the following Table 1:

TABLE 1

MD Rename/Exchange
Named Services
1-List Parent
2-List Self
3-List Children
4-Lock
5-Check
6-Update:
  Parents
  Children TABLE 1-continued

```
Self Up
Self Down
Source Up
Destination Up
Source Down
Destination Down
7-Unlock
```

The present invention disclosed herein, therefore, provides a metadisk driver, (or metastorage device with a disk-like interface), functionally intermediate a computer operating system and one or more metadrivers and underlying layered drivers which provides a driver rename/exchange function which does not depend on any particular driver having knowledge of the private data structures of any of the other drivers. Information about the configuration and state of all metadevices is preserved in a replicated state database to ensure data integrity.

While there have been described above the principles of the present invention in conjunction with specific operating systems and drivers it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for altering a prior-established driver hierarchy in a computer system including a plurality of drivers having individual and interrelational attributes with respect to others of said plurality of drivers, said method comprising the steps of:

providing for instructing a particular one of said drivers to alter its individual attribute;

providing for locking service to said particular one of said drivers and relatives of said particular one of said drivers;

providing for altering said individual attribute of said particular one of said drivers and said interrelational attributes of each of said relatives of said particular one of said drivers; and providing for unlocking service to said particular one of said drivers and said relatives of said particular one of said drivers.

2. A method for altering a prior-established driver hierarchy in a computer system including a plurality of drivers having individual and interrelational attributes with respect to others of said plurality of drivers, said method comprising the steps of:

providing for designating a particular one of said drivers to be renamed;

providing for locking service to said particular one of said drivers and related drivers thereof;

providing for renaming said particular one of said drivers to constitute a renamed driver;

providing for updating said related drivers in a parental relationship to said renamed driver to reflect said renamed driver as a child driver and said related drivers in a child relationship to said renamed driver to reflect said renamed driver as a parent driver; and providing for unlocking service to said renamed driver and said related drivers thereof.

3. A method for altering a prior-established driver hierarchy in a computer system including a plurality of drivers having individual and interrelational attributes with respect to others of said plurality of drivers, said method comprising the steps of:

providing for designating at least an unexchanged first and second of said drivers to exchange said individual attributes;

providing for locking service to said unexchanged first and second drivers and related drivers thereof;

providing for exchanging said individual attributes of said unexchanged first and second drivers to constitute said individual attributes of exchanged second and first drivers respectively;

providing for updating said related drivers in a parental relationship to said unexchanged first driver to reflect said exchanged second driver as a child driver and said related drivers in a child relationship to said unexchanged second driver to reflect said exchanged first driver as a parent driver; and providing for unlocking service to said first and second exchanged drivers and said related drivers thereof.

4. A method for altering a prior-established driver hierarchy in a computer system including a plurality of drivers having individual and interrelational attributes with respect to others of said plurality of drivers, said method comprising the steps of:

providing for compiling a list of available services for at least a designated one of said plurality of drivers;

providing for determining an individual attribute of said designated one of said plurality of drivers and said interrelational attributes of parent and child drivers thereof;

providing for locking service for said designated one of said plurality of drivers and said parent and child drivers thereof;

providing for swapping roles of said designated one of said plurality of drivers and said parent and child drivers thereof; and providing for unlocking service for said designated one of said plurality of drivers and said parent and child drivers thereof.

5. A computer program product comprising:

a computer useable medium having computer readable code embodied therein for altering a prior-established driver hierarchy in a computer system including a plurality of drivers having individual and interrelational attributes with respect to others of said plurality of drivers, the computer program product comprising:

computer readable program code devices configured to cause a computer to effect instructing a particular one of said drivers to alter its individual attribute;

computer readable program code devices configured to cause a computer to effect locking service to said particular one of said drivers and relatives of said particular one of said drivers;

computer readable program code devices configured to cause a computer to effect altering said individual attribute of said particular one of said drivers and said interrelational attributes of each of said relatives of said particular one of said drivers; and computer readable program code devices configured to cause a computer to effect unlocking service to said particular one of said drivers and said relatives of said particular one of said drivers.

6. A computer program product comprising:

a computer useable medium having computer readable code embodied therein for altering a prior-established driver hierarchy in a computer system including a plurality of drivers having individual and interrelational attributes with respect to others of said plurality of drivers, the computer program product comprising:

computer readable program code devices configured to cause a computer to effect designating a particular one of said drivers to be renamed;

computer readable program code devices configured to cause a computer to effect locking service to said a particular one of said drivers and related drivers thereof;

computer readable program code devices configured to cause a computer to effect renaming said particular one of said drivers to constitute a renamed driver;

computer readable program code devices configured to cause a computer to effect updating said related drivers in a parental relationship to said renamed driver to reflect said renamed driver as a child driver and said related drivers in a child relationship to said renamed driver to reflect said renamed driver as a parent driver; and computer readable program code devices configured to cause a computer to effect unlocking service to said renamed driver and said relatives thereof.

7. A computer program product comprising:

a computer useable medium having computer readable code embodied therein for altering a prior-established driver hierarchy in a computer system including a plurality of drivers having individual and interrelational attributes with respect to others of said plurality of drivers, the computer program product comprising:

computer readable program code devices configured to cause a computer to effect designating at least an unexchanged first and second of said drivers to exchange said individual attributes;

computer readable program code devices configured to cause a computer to effect locking service to said unexchanged first and second drivers and related drivers thereof;

computer readable program code devices configured to cause a computer to effect exchanging said individual attributes of said unexchanged first and second drivers to constitute said individual attributes of said exchanged second and first drivers respectively;

computer readable program code devices configured to cause a computer to effect updating said related drivers in a parental relationship to said unexchanged first driver to reflect said exchanged second driver as a child driver and said related drivers in a child relationship to said unexchanged second driver to reflect said exchanged first driver as a parent driver; and computer readable program code devices configured to cause a computer to effect unlocking service to said first and second exchanged drivers and said related drivers thereof.

8. A computer program product comprising:

a computer useable medium having computer readable code embodied therein for altering a prior-established driver hierarchy in a computer system including a plurality of drivers having individual and interrelational attributes with respect to others of said plurality of drivers, the computer program product comprising:

computer readable program code devices configured to cause a computer to effect compiling a list of available services for at least a designated one of said plurality of drivers;

computer readable program code devices configured to cause a computer to effect determining an individual attribute of said designated one of said plurality of drivers and said interrelational attributes of parent and child drivers thereof;

computer readable program code devices configured to cause a computer to effect locking service for said designated one of said plurality of drivers and said parent and child drivers thereof;

computer readable program code devices configured to cause a computer to effect swapping roles of said designated one of said plurality of drivers and said parent and child drivers thereof; and computer readable program code devices configured to cause a computer to effect unlocking service for said designated one of said plurality of drivers and said parent and child drivers thereof.

9. A system for altering a prior-established driver hierarchy in a computer system including a plurality of drivers having individual and interrelational attributes with respect to others of said plurality of drivers, said system comprising:

a metadisk driver coupling a computer operating system of said computer system to said plurality of drivers, said metadisk driver for causing a particular one of said drivers to alter its individual attributes; and a lock responsive to said metadisk driver having a first state thereof for locking service to said particular one of said drivers and relatives of said particular one of said drivers and a second state thereof for unlocking service to said particular one of said drivers and relatives of said particular one of said drivers;

said metadisk driver causing said lock to enter said first state thereof while said individual attribute of said particular one of said drivers and said interrelational attributes of each of said relatives of said particular one of said drivers are altered and thereafter causing said lock to enter said second state thereof.

* * * * *